Patented Feb. 7, 1939

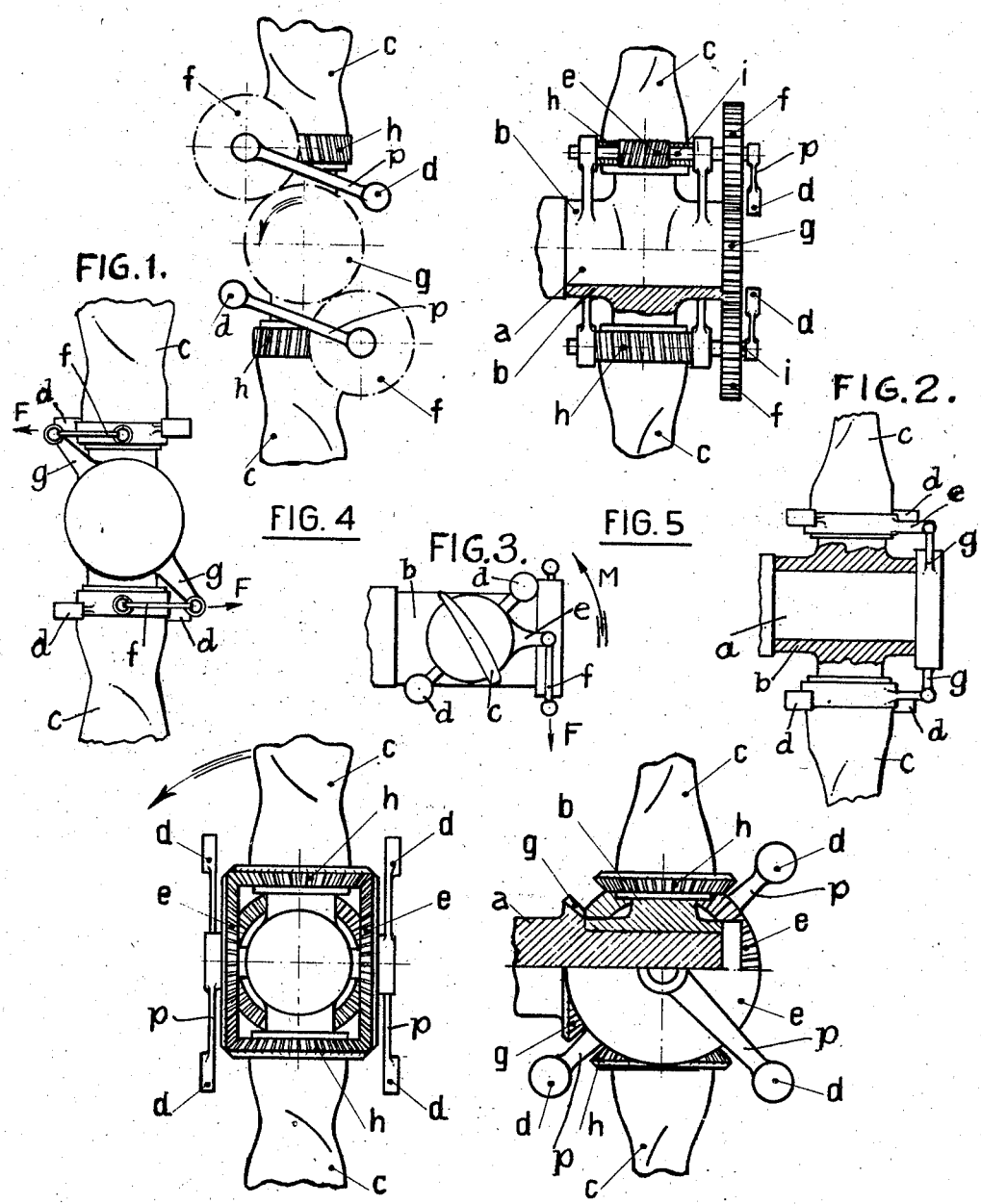

2,146,334

UNITED STATES PATENT OFFICE 2,146,334

AIR PROPELLER WITH AUTOMATICALLY VARIABLE PITCH

Ugo de Caria, Milan, Italy

Application November 29, 1935, Serial No. 52,240
In Italy January 21, 1935

2 Claims. (Cl. 170—162)

The present invention relates to propellers and more particularly pertains to automatic means for varying the pitch of propeller blades.

In connection with propellers it is well known that, in order to secure the maximum efficiency under all working conditions and in order to secure at the same time that the propeller shall always be capable of absorbing all the power developed by the engine at determined angular velocities, whatever may be the operating conditions such as the traveling velocity, and the density of the medium it is necessary to have the possibility of varying the propeller pitch while working.

Systems are already known which permit of varying the propeller pitch at the will of the pilot or other operator. In some cases however it is desirable to use propellers, the pitch of which varies automatically, in order to release the pilot or other operator from all preoccupation in this connection.

The law according to which the pitch variation is effected must be such as to suit as well as possible the working conditions of the propeller. In this respect, the systems effecting the pitch variation either in function of the angular velocity alone, or of the traveling velocity alone, or of the density of the medium alone would not fully meet the object in view because, even assuming that they suit the working conditions at full power, the working conditions at reduced power, and consequently—in particular—the working conditions at cruising speed, would very often become impaired.

It should be borne in mind that generally the power absorbed by a given propeller varies proportionally with the cube of the angular velocity, with the density of the medium and with a coefficient the value of which is a function of the propeller pitch and of the ratio between the travelling velocity and the angular velocity of the propeller.

The consequence is that, when the pitch is unvariable, if the propeller is so designed as to absorb the power developed at a determined angular velocity and with determined travelling speeds and medium densities, as soon as the travelling speed or the medium density is altered, the propeller will no longer suit the working conditions because it will no longer be capable of absorbing the same power.

An automatic pitch variation law meeting the object in view would therefore be a law in virtue of which the power absorbed by the propeller varies only in proportion to the cube of the angular velocity and remains independent from the density of the medium and the travelling velocity.

The present invention relates to an automatic system for the variation of the propeller pitch which is physically capable of substantially fulfilling such theoretical requirements.

The system consists in equalizing the torque transmitted to the propeller by the engine and a torque obtained from the centrifugal force, and in so arranging the parts that while the first named torque—in addition to rotating the propeller—tends to reduce the propeller pitch, and the second named torque tends to increase the pitch. Consequently if the propeller is running under steady conditions, and the number of revolutions increases due to any cause whatever, the centrifugal force increases and brings about an increase in the pitch which latter increase will cause the propeller to exert a greater braking action on the engine, thus causing it to slow down and so re-establishing the equilibrium. The contrary occurs if the number of revolutions decreases. If the driving torque is reduced for instance by reducing the engine feed, in a first stage the centrifugal couple will prevail, but as subsequently the number of revolutions decreases in consequence of the reduction of the driving couple and of the increased pitch, the equilibrium will be re-established between the driving couple and the centrifugal couple. As a final result a new number of revolutions and a new value of the pitch will be established.

If the driving couple is increased, in a first stage the number of revolutions will be increased and the propeller pitch decreased, but subsequently a new value of the pitch and a new value of the number of revolutions will be established which will again comply with the equilibrium conditions.

Since the centrifugal couple varies proportionally to the square of the angular velocity it is obvious that if other factors are neglected the influence of which may be conveniently reduced to a minimum, the driving couple absorbed by the propeller may be caused to likewise vary proportionally to the square of the angular velocity, and conversely the angular velocity at which the propeller brakes the engine may be maintained proportional to the square root of the driving couple applied to the propeller.

The consequence is that it is practicable to cause the power absorbed by the propeller to vary proportionally to the cube of the angular velocity of the propeller, as required.

In the annexed drawing:

Figs. 1, 2, 3 represent a first solution of the problem in front view, partly sectional side view and in plan respectively.

Figs. 4 and 5 show a second solution.

Figs. 6 and 7 show a third solution.

The propeller blades c are carried by a hub b loosely mounted on the propeller shaft a. The connection between the blade and the hub may be made according to any of the methods already in use. In all cases the blades shall be free to rotate about their respective axes.

To the shaft a is rigidly connected the arms g capable of transmitting the driving couple to each blade by means of the links f and arms e connected to the blades.

It is obvious that the driving couple places or imposes on the links f a traction F which, in addition to imparting a revolving motion to the propeller, creates on the blades a torsion moment tending to reduce the propeller pitch.

To the blades c are also suitably fixed the masses d which, owing to the centrifugal force, tend to dispose themselves in the rotation plane, thus creating a further torsion moment M opposing the torsion moment imparted by the driving couple and consequently tending to increase the propeller pitch.

The centrifugal couple M determined by the masses d, and the couple determined by the forces F which latter depend from the driving couple, must equalize one another. The first mentioned couple tends to increase the pitch while the latter couple tends to reduce the pitch, and as the centrifugal couple varies proportionally to the square of the angular velocity, the pitch will increase or be reduced dependently on each increase or reduction in the angular velocity, whereas it will be reduced or increased, in a first stage, dependently on each increase or decrease in the driving couple transmitted to the propeller, as set out above.

Since the centrifugal couple M varies, not only from the square of the angular velocity, but also from the position of the masses d which latter varies along with the propeller pitch, and since to the blades also an aerodynamic torsion moment is applied and, moreover, frictions are set up, the absolute proportionality between the power absorbed by the propeller to the cube of the angular velocity will not be realized. However, as the value of the aerodynamic torsion moment and frictions is generally very low as compared with the torsion moment M and in the case that the masses d be so arranged on extensions p that their setting angle relatively to the rotation plane varies in the neighbourhood of 45° (which angle causes M to take up a maximum value), the above said law can be realized with sufficient approximation.

Another solution which partly departs from the previous one but based on the same principle and achieves the same object is represented in Figs. 4 and 5.

In this modification the blades c are free to rotate about their respective axes and are connected to a hub b loosely mounted on the propeller shaft a. On this same shaft a is fixed a gear wheel g meshing with further gear wheels f equal in number to the propeller blades. The gear wheels f are fixed on as many shafts i, these shafts rotating in supports rigidly connected to the hub and being fitted with worms e and with arms the ends of which carry the masses d. The worms e mesh with the helical wheels h fixed on the blades.

Owing to the centrifugal force the masses d tend to move away from the rotation axis and cause rotation of the shafts i and their worms e. The worms e tend, by means of the helical wheels h, to increase the propeller pitch. On the contrary the driving couple tends, across the wheels g and f, to move the masses d nearer to the rotation axis and reduce the propeller pitch. Obviously the two opposed forces must equalize each other so that, by properly designing the weight of the masses d, the length of the arms carrying these masses, the inclination of said arms relatively to the propeller pitch, and the ratios between the wheels g and f as well as between the worms e and the helical wheels h (which must be settled case by case according to the desired characteristics), it will be possible to realize the desired law of the pitch variation with sufficient approximation.

A third solution may be that illustrated in Figs. 6 and 7.

The blades c are connected as usual to a hub b loosely mounted on the propeller shaft a. On this same shaft a is fixed, or made in one piece with it, a gear wheel g meshing with other gear wheels e loosely mounted on pins provided on the hub b. The wheels e mesh with further wheels h fixed to the blades c; the masses d are rigidly fixed to the wheels e by means of suitable arms.

The mode of working does not depart from that of the first solution described above. The driving couple, through the wheels g—e—h, tends to reduce the propeller pitch and simultaneously move the masses d away from rotation plane. The centrifugal force tends to restore the masses to the rotation plane and increase the propeller pitch. The system must therefore reach an equilibrium condition.

Having now particularly described and ascertained the nature of my said invention and in what manner the same is to be performed, I declare that what I claim is:

1. In a variable pitch propeller, a driving shaft, a hub rotatably mounted on said shaft, means preventing axial movement of said hub, a propeller blade mounted on said hub and adapted to be turned about the longitudinal axis thereof for varying the pitch of the blade, arms secured to said shaft and rotatable therewith, links connecting said arms to said blade for driving the same, said links being so constructed and arranged that when the shaft is rotated the links will also turn the blade about the longitudinal axis thereof and decrease the pitch of the blade, and extensions arranged on and projecting away from the axis of the blade and movable therewith, a mass concentrated at the end of each extension free of engagement with the shaft so as to oppose the turning of the blade about the longitudinal axis thereof by the centrifugal force set up by the moving masses and thus tend to increase the pitch of the blade independent of the angular position of said shaft with respect to said hub.

2. In a variable pitch propeller, a driving shaft, a hub member loosely mounted on said shaft, a propeller blade mounted on the hub and adapted to be turned about its longitudinal axis for varying the pitch thereof, a driving connection extending from said shaft to said blade for driving the latter and acting in response to the application of the driving force applied to said blade to turn the blade about its longitudinal axis and reduce the pitch thereof, an extension projecting radially from the blade adjacent the hub at an angle with respect to the moving plane of the blade and at a substantial angle with respect to a face of said blade, a weighted mass carried by said extension free of engagement with the shaft and influenced by the centrifugal force of the moving propeller blade for opposing the pitch reducing effect of the driving connection and increase the pitch of the blade in proportion to an increase in speed of the moving blade independent of the angular position of the hub member with respect to the shaft.

UGO DE CARIA.